United States Patent
Bailey et al.

(10) Patent No.: US 9,896,924 B2
(45) Date of Patent: *Feb. 20, 2018

(54) SQUEEZE TREATMENT FOR IN SITU SCAVENGING OF HYDROGEN SULFIDE

(71) Applicant: Ecolab USA Inc., St. Paul, MN (US)

(72) Inventors: Joseph Paul Bailey, Cundinamarca (CO); Aaron D. Martinez, Houston, TX (US); Erick J. Acosta, Sugar Land, TX (US); Ravindranath Mukkamala, Sugar Land, TX (US); Maximilian A. Silvestri, Missouri City, TX (US); Jose M. Macias, Pearland, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,728

(22) Filed: Apr. 24, 2017

(65) Prior Publication Data

US 2017/0226841 A1     Aug. 10, 2017

Related U.S. Application Data

(63) Continuation of application No. 14/108,587, filed on Dec. 17, 2013, now Pat. No. 9,631,467.

(60) Provisional application No. 61/739,382, filed on Dec. 19, 2012.

(51) Int. Cl.
*E21B 43/34* (2006.01)
*C09K 8/54* (2006.01)

(52) U.S. Cl.
CPC ............ *E21B 43/34* (2013.01); *C09K 8/54* (2013.01); *C09K 2208/20* (2013.01)

(58) Field of Classification Search
CPC .......... E21B 41/02; E21B 43/34; C09K 8/54; C09K 2208/20
See application file for complete search history.

(56) References Cited

U.S. PATENT DOCUMENTS

| | | |
|---|---|---|
| 3,096,294 A | 7/1963 | Hughes |
| 3,864,460 A | 2/1975 | Connell |
| 4,339,349 A | 7/1982 | Martin et al. |
| 4,405,581 A | 9/1983 | Savage et al. |
| 4,421,733 A | 12/1983 | Blytas |
| 4,569,766 A | 2/1986 | Kool et al. |
| 4,680,127 A | 7/1987 | Edmondson |
| 5,128,049 A | 7/1992 | Gatlin |
| 5,225,103 A | 7/1993 | Hoffmann et al. |
| 5,246,597 A | 9/1993 | Jenson et al. |
| 5,284,576 A | 2/1994 | Weers et al. |
| 5,690,174 A | 11/1997 | Chapman et al. |
| 6,024,866 A | 2/2000 | Weers et al. |
| 6,068,056 A | 5/2000 | Frenier et al. |
| 6,173,780 B1 | 1/2001 | Collins et al. |
| 6,399,547 B1 | 6/2002 | Frenier et al. |
| 6,500,237 B2 | 12/2002 | Winchester et al. |
| 6,887,447 B2 | 5/2005 | Schield et al. |
| 6,942,037 B1 | 9/2005 | Arnold et al. |
| 7,078,005 B2 | 7/2006 | Smith et al. |
| 7,216,710 B2 | 5/2007 | Welton et al. |
| 8,563,481 B2 | 10/2013 | Gatlin et al. |
| 9,052,289 B2 | 6/2015 | Lawrence et al. |
| 9,234,125 B2 | 1/2016 | Gatlin et al. |
| 2002/0157989 A1 | 10/2002 | Gatlin et al. |
| 2004/0096382 A1 | 5/2004 | Smith et al. |
| 2005/0170974 A1 | 8/2005 | Collins |
| 2006/0194700 A1 | 8/2006 | Gatlin et al. |
| 2007/0284288 A1 | 12/2007 | Gatlin |
| 2010/0163255 A1 | 7/2010 | Horton et al. |
| 2011/0237722 A1 | 9/2011 | Hill et al. |
| 2011/0315921 A1 | 12/2011 | Ramachandran et al. |
| 2012/0012507 A1 | 1/2012 | Compton et al. |
| 2012/0149117 A1 | 6/2012 | Lawrence et al. |
| 2014/0080792 A1 | 3/2014 | Jones et al. |
| 2014/0128294 A1 | 5/2014 | Gatlin et al. |
| 2014/0166282 A1 | 6/2014 | Martinez et al. |
| 2014/0166288 A1 | 6/2014 | Bailey et al. |

(Continued)

FOREIGN PATENT DOCUMENTS

| | | |
|---|---|---|
| EP | 0 279 667 B1 | 9/1995 |
| EP | 2 465 975 A1 | 6/2012 |

(Continued)

OTHER PUBLICATIONS

Kelland, Malcolm A., Production Chemicals for the Oil and Gas Industry, Chaper 15 Hydrogen Sulfide Scavengers, (2009) pp. 363-376.

(Continued)

*Primary Examiner* — Zakiya W Bates
*Assistant Examiner* — Crystal J Miller
(74) *Attorney, Agent, or Firm* — Senniger Powers LLP

(57) ABSTRACT

A method of performing a squeeze treatment comprises pumping a treatment fluid under pressure through a wellbore into a subterranean formation, wherein the treatment fluid includes a hydrogen sulfide scavenging compound that adsorbs onto the subterranean formation in a region around the wellbore. Production fluids are then allowed to flow from the subterranean formation into the wellbore, wherein the production fluids contact the adsorbed hydrogen sulfide scavenging compound as the production fluids flow through the region around the wellbore, and wherein the production fluids contain hydrogen sulfide that reacts with the hydrogen sulfide scavenging compound to reduce an amount of hydrogen sulfide in the production fluids before the production fluids flow into the wellbore.

19 Claims, No Drawings

(56) References Cited

U.S. PATENT DOCUMENTS

2014/0166289 A1    6/2014  Martinez et al.
2014/0224743 A1    8/2014  Janak

FOREIGN PATENT DOCUMENTS

WO    02/051968 A1    7/2002
WO    2012/128935 A3  9/2012

OTHER PUBLICATIONS

Kissel, Charles L. et al., Factors Contributing to the Ability of Acrolein to Scavenge Corrosive Hydrogen Sulfide, Society of Petroleum Engineers Journal, Oct. 1985, pp. 647-655.

SQUEEZE TREATMENT FOR IN SITU SCAVENGING OF HYDROGEN SULFIDE

CROSS-REFERENCE TO RELATED APPLICATIONS

This application is a continuation of U.S. Nonprovisional patent application Ser. No. 14/108,587 filed on Dec. 17, 2013, which claims the benefit of U.S. Provisional Patent Application No. 61/739,382, filed on Dec. 19, 2012.

BACKGROUND

Field of the Invention

The present invention relates to a process of chemical treatment of production fluids in a subterranean formation.

Background of the Related Art

Production fluids that are produced from subterranean formation will often contain hydrogen sulfide ($H_2$). Production fluids that include a high concentration of hydrogen sulfide are sometimes referred to as being "sour" and those production fluids that include little or no hydrogen sulfide are sometimes referred to as being "sweet." Hydrogen sulfide is a toxic and pungent gas and, because it behaves as a weak acid in water, can cause corrosion of steel equipment and pipelines. Natural gas must ordinarily contain less than 4 parts per million (ppm) of hydrogen sulfide before it can be sold. Accordingly, production fluids may be "sweetened" through a process of removing the hydrogen sulfide. Typical hydrogen sulfide removal processes use an active treatment compound that reacts with the hydrogen sulfide.

Common sweetening processes pass the already produced production fluids through equipment where the hydrogen sulfide is contacted with an active treatment compound referred to as a "hydrogen sulfide scavenger" or, more simply, a "scavenger." The hydrogen sulfide scavenger reacts with the toxic hydrogen sulfide to form a nontoxic compound. Liquid scavengers, for example, may be injected into a pipeline or processing equipment.

BRIEF SUMMARY

One embodiment of the present invention provides a method of performing a squeeze treatment. The method comprises pumping a treatment fluid under pressure through a wellbore into a subterranean formation, wherein the treatment fluid includes a hydrogen sulfide scavenging compound that adsorbs onto the subterranean formation in a region around the wellbore. Production fluids are then allowed to flow from the subterranean formation into the wellbore, wherein the production fluids contact the adsorbed hydrogen sulfide scavenging compound as the production fluids flow through the region around the wellbore, and wherein the production fluids contain hydrogen sulfide that reacts with the hydrogen sulfide scavenging compound to reduce an amount of hydrogen sulfide in the production fluids before the production fluids flow into the wellbore.

DETAILED DESCRIPTION

The present invention provides a squeeze treatment including a hydrogen sulfide scavenging compound. A "squeeze treatment" is a process of delivering a treatment fluid into a treatment zone of a subterranean formation by pumping the treatment fluid downhole under pressure, then shutting in the treatment fluid for a period of time to allow the hydrogen sulfide scavenging compound to adsorb onto the surfaces of the formation before producing additional production fluids. In one non-limiting example, the treatment fluid may be shut in for a predetermined period of time, such as between 12 and 16 hours or perhaps longer. A squeeze treatment may, in accordance with the present invention, use a treatment fluid with any of a wide variety of hydrogen sulfide scavenging compounds and their combinations.

One embodiment of the present invention provides a method of performing a squeeze treatment for scavenging hydrogen sulfide. The method comprises pumping a treatment fluid under pressure through a wellbore into a subterranean formation, wherein the treatment fluid includes a hydrogen sulfide scavenging compound that adsorbs onto the subterranean formation in a region around the wellbore. Production fluids are then allowed to flow from the subterranean formation into the wellbore. The production fluids contact the adsorbed hydrogen sulfide scavenging compound as the production fluids flow through the region around the wellbore. Accordingly, the hydrogen sulfide in the production fluids will react with the hydrogen sulfide scavenging compound to reduce an amount of hydrogen sulfide in the production fluids before the production fluids flow into the wellbore.

In a further embodiment, the method includes monitoring the concentration of hydrogen sulfide in the production fluids flowing from the subterranean formation through the wellbore. In response to the concentration of hydrogen sulfide exceeding a threshold concentration, the method may stop the flow of production fluids from the subterranean formation into the wellbore, then pump an additional amount of the treatment fluid under pressure through the wellbore into the subterranean formation, and maintain the treatment fluid in the region around the wellbore for a predetermined period of time, before restarting the flow of production fluids from the subterranean formation into the wellbore. In this manner, the amount of the hydrogen sulfide scavenging compound adsorbed onto the surfaces of the subterranean formation can be replenished at any time that the amount of the hydrogen sulfide in the produced fluid begins to rise above a desired level.

Embodiments of the present invention may use any one or more of a broad range of hydrogen sulfide scavenging compounds. The hydrogen sulfide scavenging compounds may be those having no amine functionalities. However, the hydrogen sulfide scavenging compounds may include more traditional amine-based hydrogen sulfide scavengers, such as a triazine or amino alcohols such as mono, di or triethanolamine. In a still further embodiment, the hydrogen sulfide scavenging compounds are functionalized with a variety of functional groups such as a phosphate group, phosphonate group, sulfate group, sulfonate group, or hydroxyl group. In a first option, the hydrogen sulfide scavenging compounds include two phosphate groups or two sulfate groups. In a second option, the hydrogen sulfide scavenging compounds includes at least two hydroxyl groups. The present invention may also use a hydrogen sulfide scavenging compound that is a reaction product of a carboxylic acid and an aldehyde (alpha-hydroxy alkyl ester) or a reaction product of an alcohol and an aldehyde (alpha-hydroxy alkyl ether). These later two classes of hydrogen sulfide scavenging compounds are described in greater detail below.

Embodiments of the invention may use a treatment fluid that includes between 5 and 20 volume percent of a hydrogen sulfide scavenging compound, or between 10 and 15 volume percent of the hydrogen sulfide scavenging compound. Optionally, the treatment fluid may further include a mixture of water and ethanol, such as a 50/50 mixture of water and ethanol.

The hydrogen sulfide scavenging compound preferably exhibits rock-surface adsorption, sulfide/mercaptan scavenging properties, and compatibility with high brine fluids both before and after the treatment compound reacts with sulfide/mercaptan species. After the hydrogen sulfide scavenging compound has been introduced into the formation, the compound absorbs onto the surfaces of the subterranean rock formation. The desired adsorption is provided by the chemical functionalities within the molecular structure of the treatment compound. For example, glycerol bis hemiformal includes three hydroxyl groups and two ether linkages. It is believed that the oxygenation provided by the hydroxyl groups, ether linkages and other groups such as phosphates and sulfates provides the treatment compound with the ability to adsorb onto the surface of the formation.

After the treatment compound has been successfully squeezed into the formation and adsorbed on the surface of the formation, the pressure in the well may be reduced to allow formation fluids to be produced from the formation and brought up through the well. Typical formation fluids will include connate water or brine in a mixture with liquid or gaseous hydrocarbons that contain sulfur-containing compounds, such as hydrogen sulfide or mercaptans. As those formation fluids flow through the formation toward the well, the adsorbed hydrogen sulfide scavenging compound will come into contact with the sulfur-containing compounds. The hydrogen sulfide scavenging compound may then react with the sulfur-containing compounds. It should be appreciated that having the treatment compound adsorbed on the surface of the formation will increase the contact time with formation fluids, thereby increasing the likelihood of reacting with more of the sulfur-containing compounds.

Although a squeeze treatment in accordance with the present invention may be formulated and performed solely to deliver the hydrogen sulfide scavenging compounds into the formation, a squeeze treatment may also include other compositions that provide other beneficial effects. For example, the squeeze treatment may also include a scale inhibitor.

Due to process limitations in removing hydrogen sulfide from a topside application where the fluids containing hydrogen sulfide have already been produced from the well, the ratio of hydrogen sulfide scavenging compound to hydrogen sulfide is typically about 20:1. This ratio is largely a practical function of the small amount of time over which the hydrogen sulfide is in contact with the hydrogen sulfide scavenging compound. However, when the hydrogen sulfide scavenging compound is part of a squeeze treatment in accordance with the present invention, the production fluids pass over the rock that has absorbed the hydrogen sulfide scavenging compound. Due to the high amount of surface area within this region of the subterranean formation, the contact time is much longer and the contact is more efficient. Accordingly, a ratio of about 12:1 between the hydrogen sulfide scavenging compound and hydrogen sulfide is expected in a squeeze treatment. Furthermore, the squeeze treatment avoids the need for a topside scavenging process, which is particularly beneficial for a floating production, storage and offloading (FPSO) or processing facility. Yet another benefit of the present squeeze treatment is that the in situ scavenging of hydrogen sulfide will continue to scavenge without being affected by topside process outages. By contrast, a simple pump failure can have a devastating affect a topside scavenging process and result in the produced fluids having a high hydrogen sulfide content.

Alpha-Hydroxy Alkyl Esters

The method may use any one or more of a broad range of alpha-hydroxy alkyl esters as a hydrogen sulfide scavenging compound. One embodiment of the alpha-hydroxy alkyl ester is the reaction product of a carboxylic acid and an aldehyde. Optionally, the carboxylic acid may be a mono carboxylic acid, or an oligomeric or polymeric carboxylic acid. Independently, the carboxylic acid may be saturated, unsaturated or aromatic. The alpha-hydroxy alkyl ester may also contain other products resulting from the reactions between aldehydes and carboxylic acids, and they may also be amine-free.

Another embodiment of the alpha-hydroxy alkyl ester has no nitrogen or basic nitrogen (amine functionalities). In a still further embodiment, the alpha-hydroxy alkyl ester is functionalized with a phosphate group, phosphonate group, sulfate group, sulfonate group, or hydroxyl group. In a first option, the alpha-hydroxy alkyl ester includes two phosphate groups or two sulfate groups. In a second option, the alpha-hydroxy alkyl ester includes at least two hydroxyl groups.

In a still further embodiment, the hydrogen sulfide scavenger(s) may be reaction product(s) of a monocarboxylic acid, dicarboxylic acid, oligomeric or polymeric carboxylic acid and an aldehyde, dialdehyde, oligomeric aldehyde, or polymeric aldehyde. Accordingly, these reaction products may include polyester or cyclic di-esters or some combinations thereof.

Specific example of alpha-hydroxy alkyl esters that may be used in the methods of the present invention include, without limitation, bis(hydroxymethyl) Maleate; (2E,4E)-hydroxymethyl hexa-2,4-dienoate; (E)-hydroxymethyl but-2-enoate; (E)-bis (hydroxymethyl) O,O'-(2-hydroxypropane-1,3-diyl) difumarate; hydroxymethyl 6-(2,5-dioxo-2,5-dihydro-1H-pyrrol-1-yl)hexanoate; sorbic acid, and combinations thereof.

Generic Structure

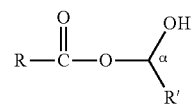

alpha-Hydroxy Alkyl Ester where: R=aliphatic, cyclic, acyclic, saturated, olefinic, aromatic; and R'=H, aliphatic, cyclic, acyclic, saturated, olefinic, aromatic.

Example Preparation
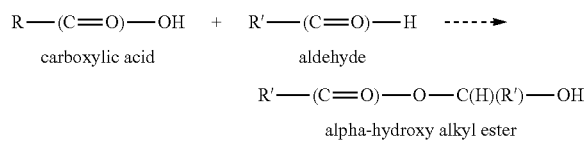
Specific Examples
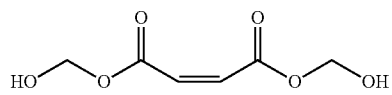 [SMILES: O=C(/C=C\C(=O)OCO)OCO]
bis(hydroxymethyl) maleate
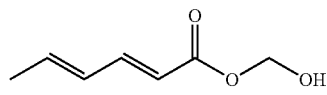
(2E, 4E)-hydroxymethyl hexa-2,2-dienoate
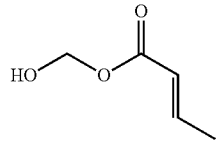
(E)-hydroxymethyl but-2-enoate
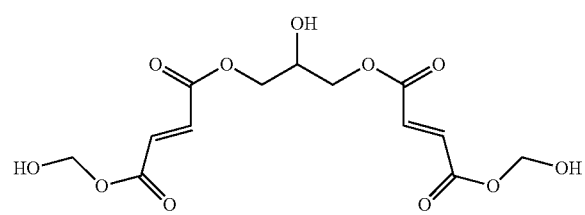 [SMILES: O=C(/C=C/C(=O)OCC(O)COC(=O)/C=C/C(=O)OCO)OCO]
(E)-bis(hydroxymethyl) O,O'-(2-hydroxypropane-1,3-diyl) difumarate
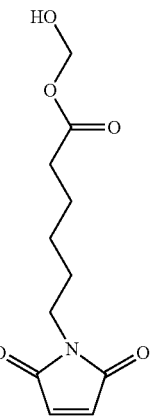
hydroxymethyl 6-(2,5-dioxo-2,5-dihydro-1H-pyrrol-1-yl)hexanoate
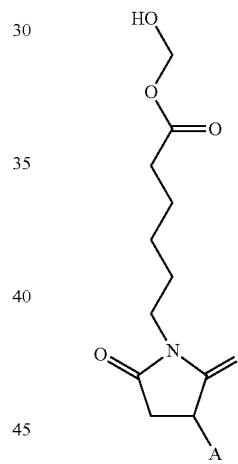
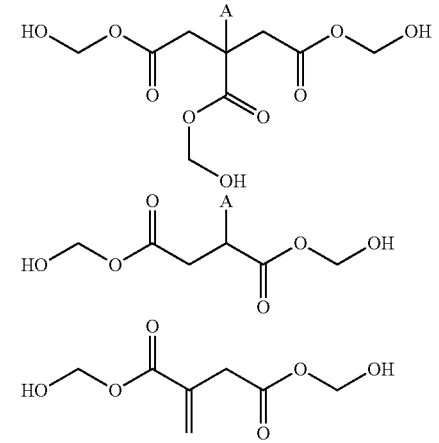

-continued

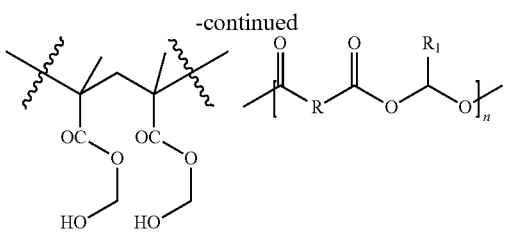

polyesters Based on Dicarboxylic Acids and Aldehydes

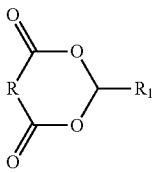

Cyclic Di-Esters Based on Dicarboxylic Acids and Aldehydes

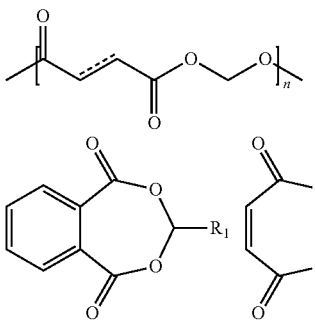

where: R=aliphatic, cyclic, acyclic, saturated, olefinic, aromatic;
$R_1$=H, aliphatic, cyclic, acyclic, saturated, olefinic, aromatic;
A=—OH, —OPO$_3$M, —SO$_3$M; —PO$_3$M$_2$; —OSO$_3$M
    M=H or metal ion; and
n=between 2 and 100 (preferably between 5 and 50, and more preferably between 10 and 20).

Alpha-Hydroxy Alkyl Ethers

The method may use any one or more of a broad range of alpha-hydroxy alkyl ethers as a hydrogen sulfide scavenging compound. One embodiment of the alpha-hydroxy alkyl ether is the reaction product on an alcohol and an aldehyde. Another embodiment of the alpha-hydroxy alkyl ether has no nitrogen or basic nitrogen (amine functionalities). In a still further embodiment, the alpha-hydroxy alkyl ether is functionalized with a phosphate group, phosphonate group, sulfate group, sulfonate group, or hydroxyl group. In a first option, the alpha-hydroxy alkyl ether includes two phosphate groups or two sulfate groups. In a second option, the alpha-hydroxy alkyl ether includes at least two hydroxyl groups.

In specific embodiments, the alpha-hydroxy alkyl ether is glycerol bis hemiformal, glycerol bis hemiformal mono phosphate ether, oligomeric glycerol bis hemiformal di-phosphate ether, glycerol bis hemiformal mono sulfate ether, oligomeric glycerol bis hemiformal di-sulfate ether, and combinations thereof. In one example, glycerol bis hemiformal may be formed by the reaction of formaldehyde and glycerol.

Generic Structure

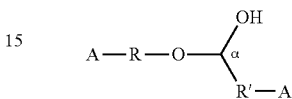

Alpha-Hydroxy Alkyl Ether where: R=aliphatic, cyclic, acyclic, saturated, olefinic, aromatic;
R'=H, aliphatic, cyclic, acyclic, saturated, olefinic, aromatic; and
A=—OH, —OPO$_3$M, —SO$_3$M, —PO$_3$M$_2$, —OSO$_3$M.

Example Preparation

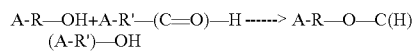

alcohol aldehyde alpha-hydroxy alkyl ether

Specific Examples

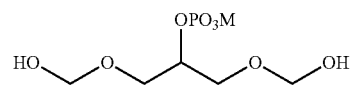

Glycerol Bis Hemiformal Mono Phosphate Ether

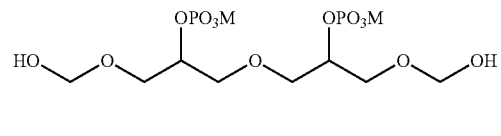

Oligomeric Glycerol Bis Hemiformal Di-Phosphate Ether

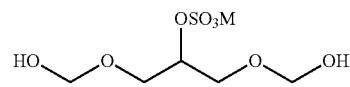

Glycerol Bis Hemiformal Mono Sulfate Ether

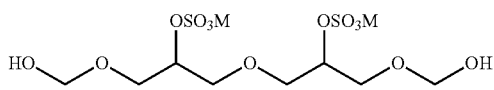

Oligomeric Glycerol Bis Hemiformal Di-Sulfate Ether where: M=H or metal ion.

EXAMPLES

Performance Evaluation of Hydrogen Sulfide Scavenging Compounds

The performance of various hydrogen sulfide scavenging compounds was measured using a dynamic testing apparatus. A cadmium chloride solution was prepared by adding 125 grams of $CdCl_2 \times 2.5H_2O$ to a small amount of water and dilution to 1 liter. Next, a 0.01 molar concentration solution of HCl is made using 8.5 milliters of concentrated HCl diluted to 1 liter. A 0.1N iodine solution and 0.1N $Na_2S_2O_3$ solution were purchased for the iodiometric titrations along with a starch reagent.

A dynamic testing apparatus was used to perform a dynamic test as described in ASTM-D5705. Two sparging flasks were filled with the $CdCl_2$ solution and 15 ml of the 0.01 M HCl solution. The two flasks were connected using ⅝" ID tubing. One of the hydrogen sulfide scavenging compounds was then placed into an empty sparging flask, which was itself connected by tubing to the flasks containing the $CdCl_2$ solutions. The system was then purged with nitrogen gas to displace any hydrogen sulfide from the fluid medium. CdS production is indicated by the formation of a yellow precipitate. A sour fluid sample is dosed with the scavenger chemistry that is to be screened, sealed and placed into a heated mixing oven to simulate heated agitation.

The scrubbed CdS from the flasks is removed once the hydrogen sulfide has been completely purged and is placed into a beaker for titration. A magnetic stir bead is added to the beaker and placed onto a stir plate. Iodine solution and starch are added until the mixture has changed to the color of the iodine. $Na_2S_2O_3$ was then used to titrate the iodine/CdS mixture. The CdS mixture was then titrated until the solution turned clear (endpoint). A calculation determined the remaining hydrogen sulfide using the results from the titration. This procedure allowed for measurement of $H_2$ in the original fluid medium without interference from the reaction product of the hydrogen sulfide scavenging compound and $H_2S$.

TABLE 1

Results of Performance Testing

| Scavenger Composition | Hydrogen Sulfide Removed in Liquid Phase (%) | Extent of Reaction (%) |
| --- | --- | --- |
| Glycerol bis-hemiformal | 100 | 19.50 |
| Glycerol hemiformal phosphate ester | 94 | 20.38 |
| Triazine | 100 | 25 |
| Glycerol Bis maleic acid adduct | 87 | 25.30 |
| Glycerol propionic acid adduct | 85 | 29.71 |

TABLE 1-continued

Results of Performance Testing

| Scavenger Composition | Hydrogen Sulfide Removed in Liquid Phase (%) | Extent of Reaction (%) |
| --- | --- | --- |
| Glycerol Oligomer Bis propionic acid adduct | 81 | 24.43 |
| Glycerol oligomer Bis propionaldehyde adduct | 85 | 18.28 |

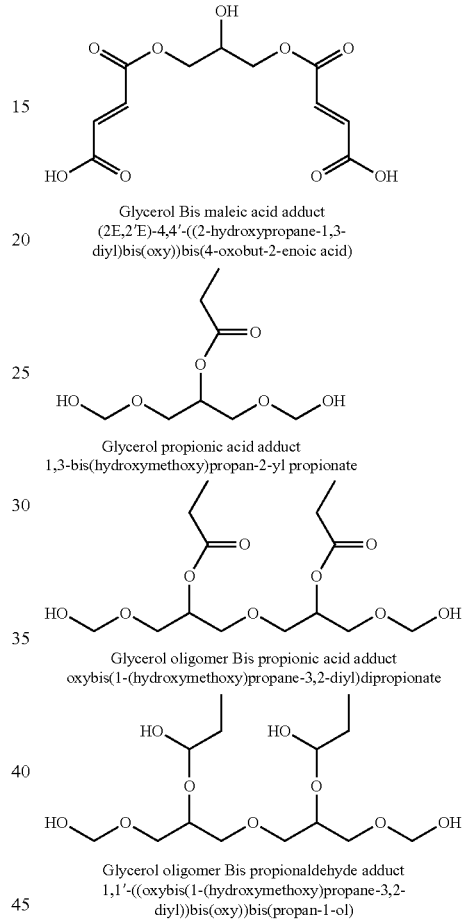

Glycerol Bis maleic acid adduct
(2E,2'E)-4,4'-((2-hydroxypropane-1,3-diyl)bis(oxy))bis(4-oxobut-2-enoic acid)

Glycerol propionic acid adduct
1,3-bis(hydroxymethoxy)propan-2-yl propionate

Glycerol oligomer Bis propionic acid adduct
oxybis(1-(hydroxymethoxy)propane-3,2-diyl)dipropionate Glycerol oligomer Bis propionaldehyde adduct
1,1'-((oxybis(1-(hydroxymethoxy)propane-3,2-diyl))bis(oxy))bis(propan-1-ol)

Table 1 shows the efficacy of a hydrogen sulfide scavenging compound in terms of the percent of $H_2S$ removed and the percent extent of reaction. The percent of $H_2S$ removed is related to the overall scavenging capacity of the chemical. A high percent of percent of $H_2S$ removed is desired. The percent extent of reaction is calculated based on the ratio of the chemical's theoretical capacity versus the actual capacity. It is desired to have a high percent extent of reaction indicating that the scavenger molecule is reacting preferentially with the sulfur species to a greater extent so as not to be wasted in the scavenging process. Depending upon the chemical application a more prolonged effect of $H_2S$ may be desired versus a fast acting scavenging agent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A squeeze treatment method for reducing the amount of hydrogen sulfide in a hydrocarbon-containing fluid, comprising:
   pumping a treatment fluid under pressure through a wellbore into a subterranean formation, wherein the treatment fluid includes a hydrogen sulfide scavenging compound that adsorbs onto the subterranean formation in a region around the wellbore;
   flowing production fluids from the subterranean formation into the wellbore, wherein the production fluids contact the adsorbed hydrogen sulfide scavenging compound as the production fluids flow through the region around the wellbore, and wherein the production fluids contain hydrogen sulfide that reacts with the hydrogen sulfide scavenging compound to reduce an amount of hydrogen sulfide in the production fluids before the production fluids flow into the wellbore;
   monitoring the concentration of hydrogen sulfide in the production fluids flowing from the subterranean formation through the wellbore; and
   in response to the concentration of hydrogen sulfide exceeding a threshold concentration, stopping the flow of production fluids from the subterranean formation into the wellbore, then pumping an additional amount of the treatment fluid under pressure through the wellbore into the subterranean formation, then maintaining the treatment fluid in the region around the wellbore for a predetermined period of time, and then restarting the flow of production fluids from the subterranean formation into the wellbore.

2. The method of claim 1, wherein the treatment fluid is maintained in the region around the wellbore for a predetermined period of time to allow the hydrogen sulfide scavenging compound to adsorb onto the subterranean formation.

3. The method of claim 2, wherein the predetermined period of time is between 12 and 16 hours.

4. The method of claim 2, wherein the predetermined period of time is greater than 16 hours.

5. The method of claim 1, wherein the hydrogen sulfide scavenging compound includes at least one functional group selected from a phosphate group, phosphonate group, sulfonate group and a sulfate group.

6. The method of claim 1, wherein the hydrogen sulfide scavenging compound includes two phosphate groups or two sulfate groups.

7. The method of claim 1, wherein the hydrogen sulfide scavenging compound includes two phosphonate groups or two sulfonate groups.

8. The method of claim 1, wherein the hydrogen sulfide scavenging compound includes at least two hydroxyl groups.

9. The method of claim 1, wherein the hydrogen sulfide scavenging compound is glycerol bis hemiformal.

10. The method of claim 1, wherein the hydrogen sulfide scavenging compound is a reaction product of an aldehyde and an alcohol.

11. The method of claim 1, wherein the hydrogen sulfide scavenging compound is a reaction product of a carboxylic acid and an aldehyde.

12. The method of claim 11, wherein the hydrogen sulfide scavenging compound is an alpha-hydroxy alkyl ester.

13. The method of claim 12, wherein the alpha-hydroxy alkyl ester is functionalized with a phosphate group, phosphonate group, sulfate group, sulfonate group, or hydroxyl group.

14. The method of claim 1, wherein the hydrogen sulfide scavenging compound is a reaction product of an alcohol and an aldehyde.

15. The method of claim 14, wherein the hydrogen sulfide scavenging compound is an alpha-hydroxy alkyl ether.

16. The method of claim 15, wherein the alpha-hydroxy alkyl ether is functionalized with a phosphate group, phosphonate group, sulfate group, sulfonate group, or hydroxyl group.

17. The method of claim 1, wherein the hydrogen sulfide scavenging compound is amine-free.

18. The method of claim 1, wherein the hydrogen sulfide scavenging compound is a triazine.

19. The method of claim 1, wherein the treatment fluid includes between 5 and 20 volume percent of the hydrogen sulfide scavenging compound.

* * * * *